US012763604B2

(12) United States Patent
Kimura et al.

(10) Patent No.: US 12,763,604 B2
(45) Date of Patent: Oct. 13, 2026

(54) CONTACTLESS POWER FEEDING SYSTEM, CONTROL PROGRAM FOR CONTACTLESS POWER FEEDING SYSTEM, VEHICLE, AND CONTACTLESS POWER FEEDING POWER RECEIVING DEVICE

(71) Applicants: TOYOTA JIDOSHA KABUSHIKI KAISHA, Toyota (JP); DENSO CORPORATION, Kariya (JP)

(72) Inventors: Kazutaka Kimura, Toyota (JP); Toshiya Hashimoto, Miyoshi (JP); Makoto Hashimoto, Seto (JP); Masaki Kanesaki, Aichi (JP); Nobuhisa Yamaguchi, Aichi (JP); Keisuke Tani, Aichi (JP); Kazuyoshi Obayashi, Aichi (JP); Yuichi Takemura, Aichi (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 11 days.

(21) Appl. No.: 18/867,973

(22) PCT Filed: Apr. 3, 2023

(86) PCT No.: PCT/JP2023/013859
§ 371 (c)(1),
(2) Date: Nov. 21, 2024

(87) PCT Pub. No.: WO2023/233803
PCT Pub. Date: Dec. 7, 2023

(65) Prior Publication Data
US 2025/0330047 A1 Oct. 23, 2025

(30) Foreign Application Priority Data
May 30, 2022 (JP) ................................ 2022-087915

(51) Int. Cl.
*H02J 50/10* (2016.01)
*B60L 53/126* (2019.01)
*H02J 50/40* (2016.01)

(52) U.S. Cl.
CPC ........... *H02J 50/10* (2016.02); *B60L 53/126* (2019.02); *H02J 50/40* (2016.02)

(58) Field of Classification Search
CPC .......... H02J 50/10; H02J 50/40; B60L 53/126
See application file for complete search history.

(56) References Cited

U.S. PATENT DOCUMENTS

2013/0119927 A1 5/2013 Partovi
2014/0285029 A1* 9/2014 Ichikawa ............... B60L 58/12 307/104
(Continued)

FOREIGN PATENT DOCUMENTS

CN 114268173 A * 4/2022
FR 2947113 A1 * 12/2010 ............. H02J 50/12
(Continued)

OTHER PUBLICATIONS

CN114268173A machine translation (Year: 2022).*
(Continued)

*Primary Examiner* — Navid Z. Mehdizadeh
*Assistant Examiner* — Oliver Tan
(74) *Attorney, Agent, or Firm* — Sughrue Mion, PLLC

(57) ABSTRACT

A contactless power feeding system that contactlessly supplies power from a power supply segment on a traveling path to a vehicle, includes: a power transmission characteristic acquisition unit, provided on the power supply segment, measures a power transmission characteristic of the power supply segment; a power reception characteristic acquisition unit, provided on the vehicle and measures a power reception characteristic of the vehicle; and an abnormality detec-
(Continued)

tion means that matches a measurement period of the power transmission characteristic of the power supply segment with a measurement period of the power reception characteristic of the vehicle, calculates efficiency of the power supply segment using the power transmission characteristic of the power supply segment and the power reception characteristic of the vehicle, the measurement periods of which are matched, and determines abnormality of the power supply segment on a basis of the calculated efficiency.

4 Claims, 4 Drawing Sheets

(56) References Cited

U.S. PATENT DOCUMENTS

| | | | |
|---|---|---|---|
| 2022/0032778 A1 | 2/2022 | Kanesaki et al. | |
| 2022/0072965 A1 | 3/2022 | Mazaki et al. | |
| 2023/0347759 A1* | 11/2023 | Maekawa | B60L 53/122 |

FOREIGN PATENT DOCUMENTS

| | | | |
|---|---|---|---|
| JP | 2015089221 A | * | 5/2015 |
| JP | 2020-178471 A | | 10/2020 |
| JP | 2020178437 A | * | 10/2020 |

OTHER PUBLICATIONS

FR-2947113-A1 (Year: 2010).*
JP-2020178437-A (Year: 2020).*
JP2015089221A machine translation (Year: 2015).*
"The Qi wireless power transfer system power class 0 specification—Parts 1 and 2: Interface Definitions", International Electrotechnical Commission, May 10, 2017, Edition 1.0, IEC PAS 63095-1, pp. 1-160 (164 pages).

* cited by examiner

CONTACTLESS POWER FEEDING SYSTEM, CONTROL PROGRAM FOR CONTACTLESS POWER FEEDING SYSTEM, VEHICLE, AND CONTACTLESS POWER FEEDING POWER RECEIVING DEVICE

FIELD

The present disclosure relates to a contactless power feeding system, a control program for the contactless power feeding system, a vehicle, and a contactless power feeding power receiving device.

BACKGROUND

Patent Literature 1 discloses a technology for detecting abnormality in a power supply segment that contactlessly supplies power to a traveling vehicle. Specifically, the technology disclosed in Patent Literature 1 determines whether there is abnormality in electrical characteristic of a target segment by sharing an electrical characteristic with a target segment to be subjected to abnormality determination, and at least one of a previous segment supplied with power before the target segment and a subsequent segment supplied with power after the target segment, and comparing the electrical characteristic of the target segment with at least one of the electrical characteristic of the previous segment and the electrical characteristic of the subsequent segment.

CITATION LIST

Patent Literature

Patent Literature 1: Japanese Laid-open Patent Publication No. 2020-178471

SUMMARY

Technical Problem

According to the technology disclosed in Patent Literature 1, it is not possible to individually detect abnormality of the power supply segment. In case where abnormality occurs in a plurality of consecutive power supply segments, abnormality of the power supply segment cannot be detected.

The present disclosure has been achieved in view of the above-described problem, and an object thereof is to provide a contactless power feeding system, a control program for the contactless power feeding system, a vehicle, and a contactless power feeding power receiving device capable of individually detecting abnormality of a power supply segment and detecting abnormality in power supply segment even in a case where abnormality occurs in a plurality of consecutive power supply segments.

Solution to Problem

According to an embodiment, a contactless power feeding system that contactlessly supplies power from a power supply segment provided on a traveling path of a vehicle to a traveling vehicle, includes: a power transmission characteristic acquisition unit that is provided on a side of the power supply segment and measures a power transmission characteristic of the power supply segment; a power reception characteristic acquisition unit that is provided on a side of the vehicle and measures a power reception characteristic of the vehicle; and an abnormality detection means that matches a measurement period of the power transmission characteristic of the power supply segment measured by the power transmission characteristic acquisition unit with a measurement period of the power reception characteristic of the vehicle measured by the power reception characteristic acquisition unit, calculates efficiency of the power supply segment using the power transmission characteristic of the power supply segment and the power reception characteristic of the vehicle, the measurement periods of which are matched, and determines abnormality of the power supply segment on a basis of the calculated efficiency.

According to an embodiment, a non-transitory computer-readable recording medium stores a control program of a contactless power feeding system that contactlessly supplies power from a power supply segment provided on a traveling path of a vehicle to a traveling vehicle, the control program causing a computer to execute: a power transmission characteristic acquisition step of measuring a power transmission characteristic of the power supply segment; a power reception characteristic acquisition step of measuring a power reception characteristic of the vehicle; and an abnormality detection step of matching a measurement period of the power transmission characteristic of the power supply segment measured by the power transmission characteristic acquisition process with a measurement period of the power reception characteristic of the vehicle measured by the power reception characteristic acquisition process, calculating efficiency of the power supply segment using the power transmission characteristic of the power supply segment and the power reception characteristic of the vehicle, the measurement periods of which are matched, and determining abnormality of the power supply segment on a basis of the calculated efficiency.

According to an embodiment, a vehicle capable of receiving power from a contactless power feeding system that contactlessly supplies power from a power supply segment provided on a traveling path of a vehicle to a traveling vehicle, includes: a power reception characteristic acquisition unit that measures a power reception characteristic of the vehicle; and a notification device that notifies an abnormality detection means of the contactless power feeding system of the measured power reception characteristic. Further, the vehicle that causes the abnormality detection means to match a measurement period of a power transmission characteristic of the power supply segment measured by a power transmission characteristic acquisition unit provided on a side of the power supply segment with a measurement period of the power reception characteristic of the vehicle measured by the power reception characteristic acquisition unit, calculate efficiency of the power supply segment using the power transmission characteristic of the power supply segment and the power reception characteristic of the vehicle, the measurement periods of which are matched, and determine abnormality of the power supply segment on a basis of the calculated efficiency.

According to an embodiment, a contactless power feeding power receiving device mounted on a vehicle capable of receiving power from a contactless power feeding system that contactlessly supplies power from a power supply segment provided on a traveling path of a vehicle to a traveling vehicle, includes: a power reception characteristic acquisition unit that measures a power reception characteristic of the vehicle; and a notification device that notifies an abnormality detection means of the contactless power feeding system of the measured power reception characteristic. Further, the contactless power feeding power receiving device causes the abnormality detection means to match a measurement period of a power transmission characteristic of the power supply segment measured by a power transmission characteristic acquisition unit provided on a side of the power supply segment with a measurement period of the power reception characteristic of the vehicle measured by the power reception characteristic acquisition unit, calculate efficiency of the power supply segment using the power transmission characteristic of the power supply segment and the power reception characteristic of the vehicle, the measurement periods of which are matched, and determine abnormality of the power supply segment on a basis of the calculated efficiency.

Advantageous Effects of Invention

A contactless power feeding system, a control program for the contactless power feeding system, a vehicle, and a contactless power feeding power receiving device according to an embodiment determines abnormality of a power supply segment using power information acquired by matching acquisition timing on a vehicle side and a power supply segment side, so that it is possible to individually detect abnormality of the power supply segment and detect abnormality in power supply segment even in a case where abnormality occurs in a plurality of consecutive power supply segments.

DESCRIPTION OF EMBODIMENTS

A contactless power feeding system being one embodiment of the present disclosure is hereinafter described in detail with reference to the drawings.

Figure 1:
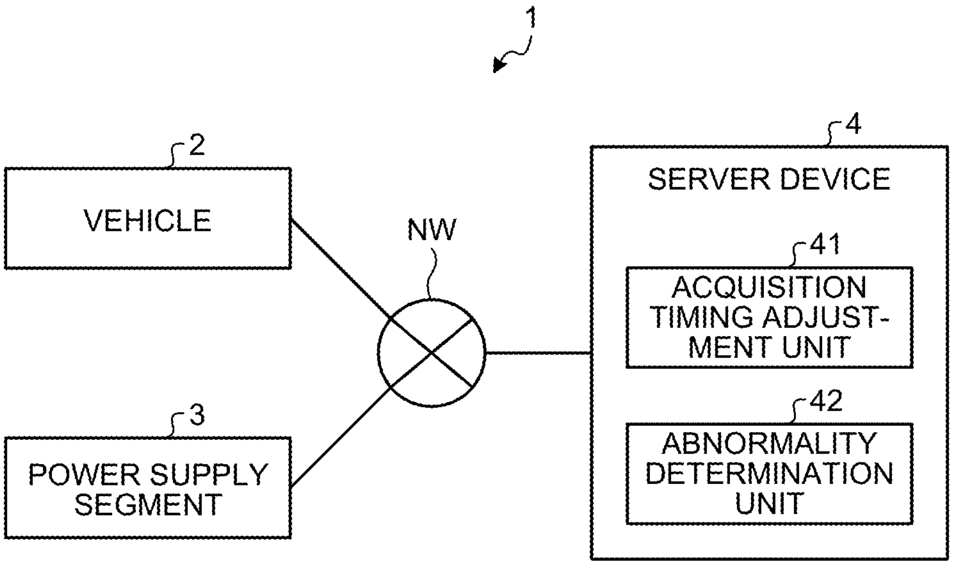
FIG. 1 is a block diagram illustrating a configuration of a contactless power feeding system being one embodiment of an embodiment.

FIG. 1 is a block diagram illustrating a configuration of a contactless power feeding system being one embodiment of the present disclosure. As illustrated in FIG. 1, a contactless power feeding system 1 being one embodiment of the present disclosure is a system that contactlessly supplies power to a traveling vehicle, and includes a vehicle 2, a power supply segment 3, and a server device 4.

Figure 2:
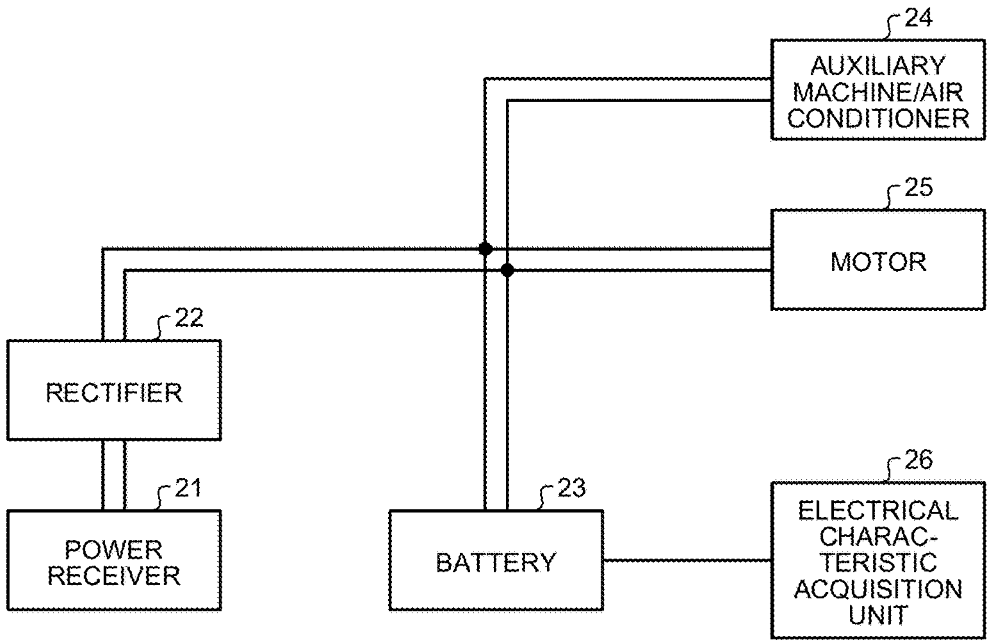
FIG. 2 is a block diagram illustrating a configuration of a vehicle illustrated in FIG. 1.

The vehicle 2 is formed of a known vehicle such as a hybrid vehicle (HV), an electric vehicle (EV), a plug-in hybrid vehicle (PHV), or a fuel cell electric vehicle (FCEV), and includes a communication module capable of performing information communication via an electrical communication line NW such as an Internet line network or a mobile phone line network. As illustrated in FIG. 2, the vehicle 2 includes a power receiver 21 that receives power supplied from the power supply segment 3 and a rectifier 22 that rectifies the power received by the power receiver 21. The rectifier 22 supplies the rectified power to each unit of the vehicle 2 such as a battery 23, an auxiliary machine/air conditioner 24, and a motor 25.

The vehicle 2 includes an electrical characteristic acquisition unit 26 that measures an input power (received power) waveform from the power supply segment 3 to the battery 23. The electrical characteristic acquisition unit 26 transmits information regarding the measured input power waveform to the battery 23 to the server device 4 via the electrical communication line NW together with information (measurement time information) regarding a time at which the input power waveform to the battery 23 is measured and information (vehicle ID) regarding unique identification information assigned to each vehicle 2. Examples of the measurement time information include time information of a measurement time clocked using a radio clock and a count value of a period in which the vehicle 2 travels on the power supply segment 3.

Figure 3:
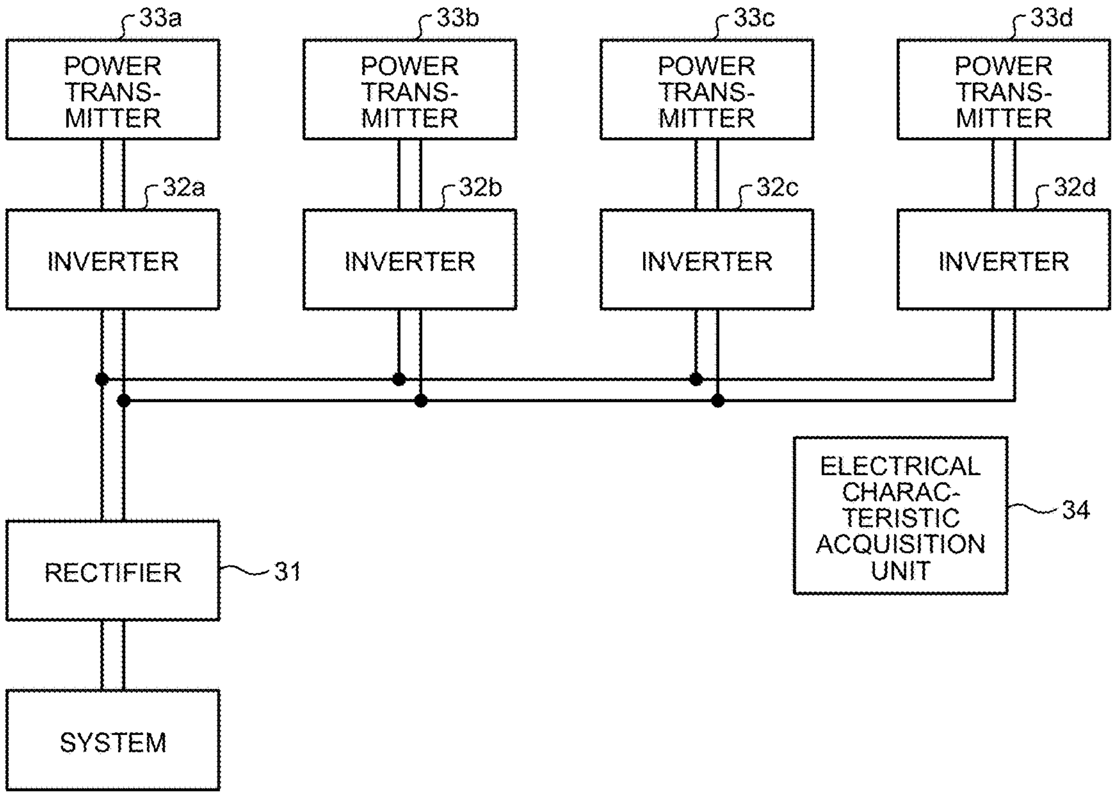
FIG. 3 is a block diagram illustrating a configuration of a power supply segment illustrated in FIG. 1.

As illustrated in FIG. 3, the power supply segment 3 includes a rectifier 31 that rectifies a DC voltage from a system, a plurality of inverters 32*a* to 32*d* that converts the DC voltage rectified by the rectifier 31 into an AC voltage, and a plurality of power transmitters 33*a* to 33*d* that transmits the AC voltage output from the plurality of inverters 32*a* to 32*d* to the vehicle 2.

The power supply segment 3 includes an electrical characteristic acquisition unit 34 that measures an input power (transmitted power) waveform from the power transmitters 33*a* to 33*d*. The electrical characteristic acquisition unit 34 transmits information regarding the measured input power waveform of the power transmitters 33*a* to 33*d* to the server device 4 via the electrical communication line NW together with information (measurement time information) regarding a time at which the input power waveform of the power transmitters 33*a* to 33*d* is measured, information (segment ID) regarding unique identification information assigned to each power supply segment 3, and information regarding the vehicle ID of the vehicle 2 to which the power is supplied. Examples of the measurement time information include time information of a measurement time clocked using a radio clock and a count value of a period in which the vehicle 2 travels on the power supply segment 3. The information regarding the input power waveform to be transmitted is information plotted at one or more time at least (such as 2:30:1 and 2:30:1.1), and, for example, a time at which the input power waveform reaches peak power, a time at which the input power waveform becomes half the peak power and the like may be picked up and transmitted as a feature point of the input power waveform.

Returning to FIG. 1, the server device 4 includes an information processing device such as a workstation, and is connected to the vehicle 2 and the power supply segment 3 via the electrical communication line NW. The server device 4 performs information communication with the vehicle 2 and the power supply segment 3 via the electrical communication line NW. The server device 4 serves as an acquisition timing adjustment unit 41 and an abnormality determination unit 42 when an arithmetic processing device such as a CPU in the information processing device executes a computer program.

The acquisition timing adjustment unit 41 acquires information from the electrical characteristic acquisition unit 26 and the electrical characteristic acquisition unit 34 via the electrical communication line NW, and associates the input power waveform to the battery 23 with the input power waveform of the power transmitters 33*a* to 33*d* regarding the same vehicle 2 on the basis of the vehicle ID included in the acquired information. Then, as illustrated in parts (a) to (c) of FIG. 4, the acquisition timing adjustment unit 41 matches a measurement period of the input power waveform to the battery 23 with a measurement period of the input power waveform of the power transmitters 33*a* to 33*d* associated with each other on the basis of the measurement time information included in the acquired information. In the example illustrated in parts (a) to (c) of FIG. 4, a rise time of the input power waveform of a power transmitter A matches with a rise time of the input power waveform to the battery 23 at time T=T2, a rise time of the input power waveform of a power transmitter B matches with the rise time of the input power waveform to the battery 23 at time T=T4, an extinction time of the input power waveform of the power transmitter A matches with an extinction time of the input power waveform to the battery 23 at time T=T5, and an extinction time of the input power waveform of the power transmitter B matches with the extinction time of the input power waveform to the battery 23 at time T=T6.

Figure 4:
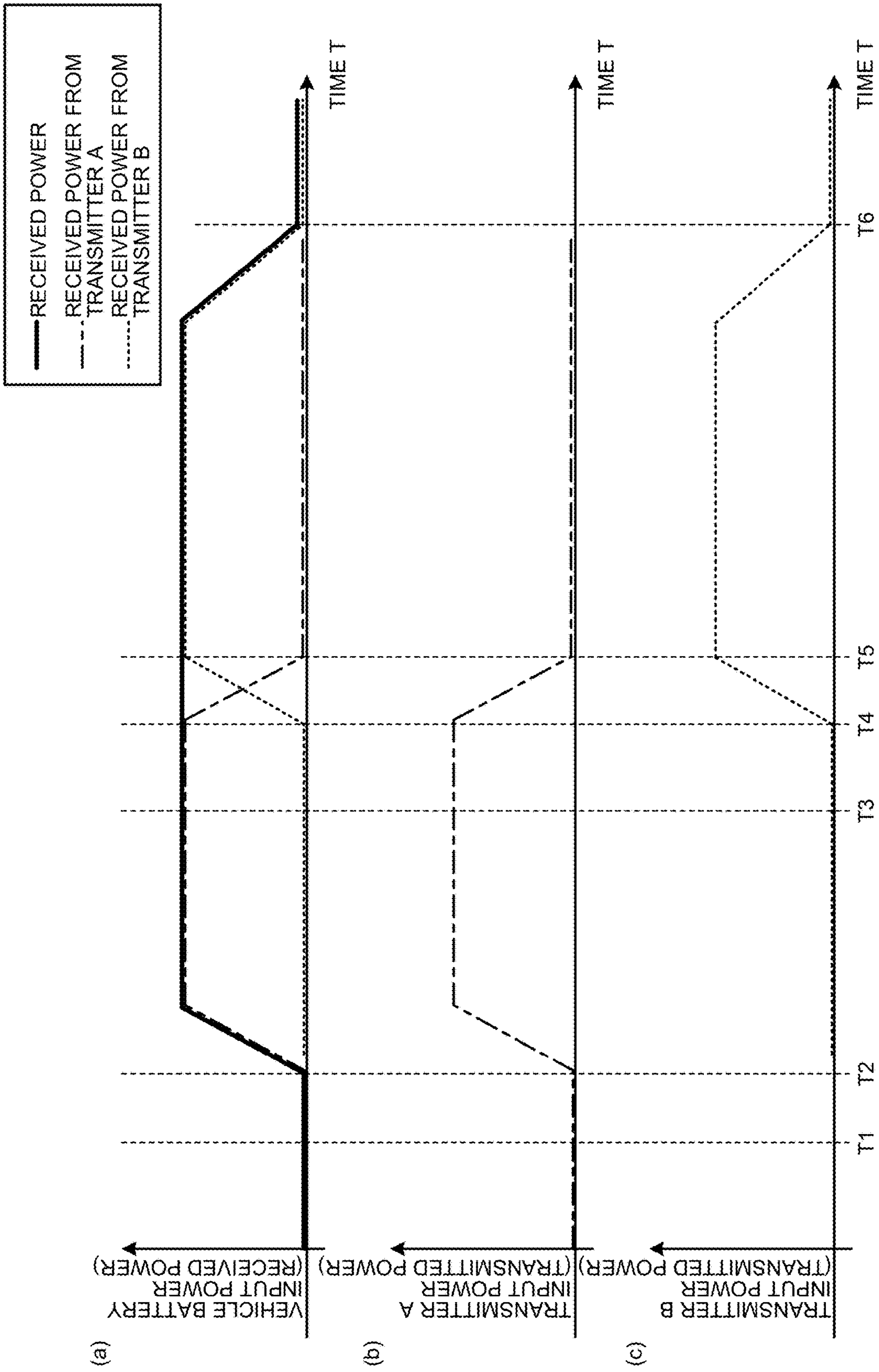
FIG. 4 is a diagram for explaining operations of an acquisition timing adjustment unit and an abnormality determination unit of a server device.

The abnormality determination unit 42 determines abnormality of the power supply segment 3 using the input power waveform to the battery 23 and the input power waveform of the power transmitters 33*a* to 33*d* the measurement periods of which are matched by the acquisition timing adjustment unit 41, and notifies an administrator and the like of information regarding the segment ID of the power supply segment 3 determined to be abnormal. For example, in the example illustrated in parts (a) to (c) of FIG. 4, average charging efficiency of the power transmitter A is calculated by dividing a value obtained by subtracting a transmitted power amount of the power transmitter B at time T=T4 to T5 from a received power amount of the battery 23 at time T=T2 to T5 by a transmitted power amount of the power transmitter A at time T=T2 to T5. Then, in a case where the calculated average charging efficiency does not fall within a predetermined range, the abnormality determination unit 42 determines that there is abnormality in the power transmitter A and notifies the administrator and the like of the segment ID of the power transmitter A. Similarly, the abnormality determination unit 42 determines abnormality of the power transmitter B. The abnormality determination unit 42 may determine abnormality using charging efficiency at any timing instead of the average charging efficiency. However, in this case, as any timing, timings at which the plurality of power transmitters is driven (for example, times T=T4 to T5 illustrated in parts (a) to (c) of FIG. 4 is excluded. Time T=T1 and T3 illustrated in parts (a) to (c) of FIG. 4 indicate timings at which power feeding of the power transmitter A and the power transmitter B is permitted, respectively.

As is clear from the description above, in the contactless power feeding system 1 being one embodiment of the present disclosure, the server device 4 matches the measurement period of the input power waveform to the battery 23 with the measurement period of the input power waveform of the power transmitters 33*a* to 33*d*, and then determines whether abnormality occurs in the power supply segment 3 on the basis of the efficiency of the power supply segment 3 obtained from the input power waveform to the battery 23 and the input power waveform of the power transmitters 33*a* to 33*d*. As a result, abnormality of the power supply segment 3 can be detected individually, and abnormality of the power supply segment 3 can be detected even in a case where abnormality occurs in a plurality of consecutive power supply segments 3.

Definition of Matching

In in-travel power feeding, a positional relationship between the power receiver and the power transmitter changes from moment to moment depending on the travel of the vehicle. This change in positional relationship can also be said to be a change in upper limit value of feed power (ease of feeding power); for example, in a case where feeding is continued at an upper limit value of the feed power without controlling the feed power, if the measurement period of the power waveform deviates, a large difference occurs in power for comparing the efficiency between the vehicle side and the power supply segment side. In a measuring method, an upper limit of measurement accuracy (measurement error) is set to 5% until 50 kW and 3% until 500 kW. A catalog value of the measurement accuracy is 2.5%. Under such circumstances, it can be understood that high measurement accuracy such as 3% is required for required measurement accuracy when performing power measurement. When the upper limit of the measurement accuracy is set to 3% and the measurement accuracy of the sensor is 2.5%, there is only a margin of 0.5% in measurement accuracy, and an error (condition change) exceeding 0.5% is not allowed. Therefore, as the definition of "matching" described above, the condition change that falls within a change of less than 0.5% is required.

Figure 5:
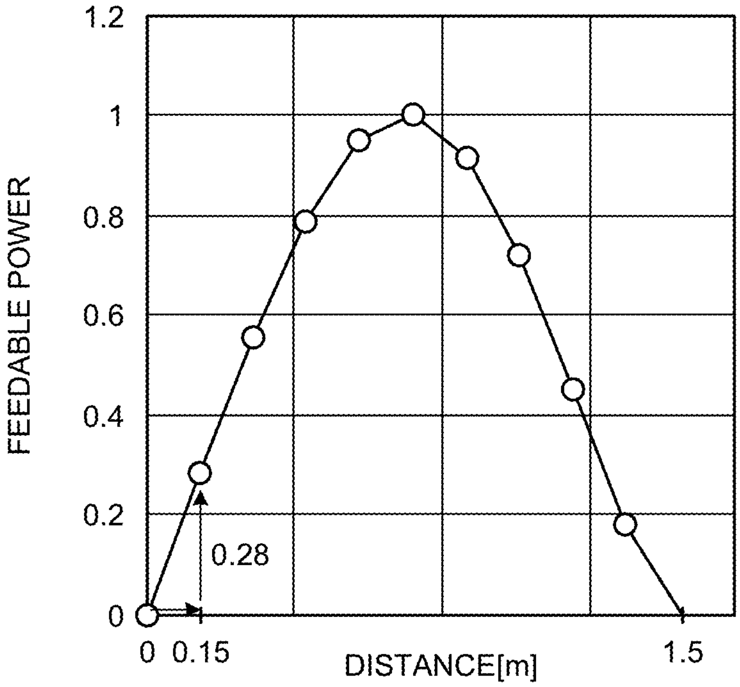
FIG. 5 is a diagram illustrating an example of a feedable power characteristic.
Figure 6:
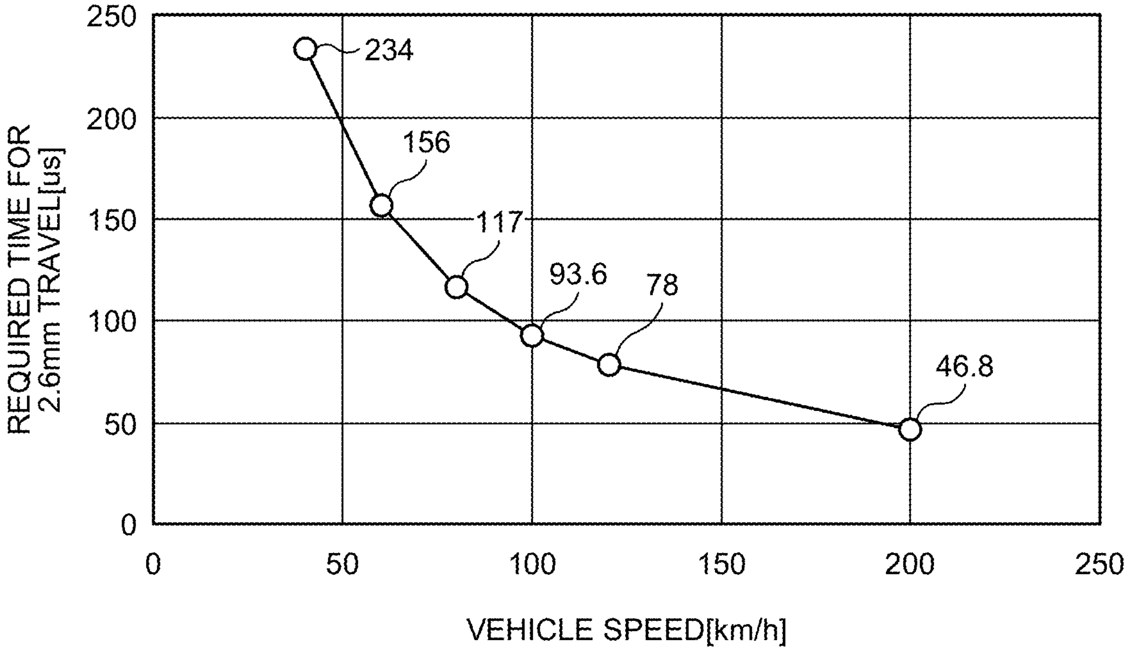
FIG. 6 is a diagram illustrating an example of a relationship between a time required for a vehicle to travel 2.6 mm and a vehicle speed.

For example, in a case where a length of the power receiver is 1.5 m, a feedable power characteristic is as illustrated in FIG. 5. The feedable power characteristic illustrated in FIG. 5 is obtained by normalizing the feedable power characteristic by a position of the power receiver with respect to the power transmitter. As illustrated in FIG. 5, it can be understood that a value of the power varies by 28% as a positional relationship between the power receiver and the power transmitter changes by 15 cm. Therefore, from the viewpoint of a variation range of 0.5%, since it varies by 0.5% with a deviation of 2.6 mm, accuracy of the power acquisition timing of 2.6 mm or less is required as the distance. A time corresponding to a vehicle speed is organized for 2.6 mm as illustrated in FIG. 6, and it can be said that the vehicle speed can be covered in general when a time corresponding to matching is set to 50 us or less. Note that, in this example, the length of the power receiver is 1.5 m, but if the length is 0.75 m, which is a half, the time corresponding to matching is 25 us or less, which is a half, and a specific value of matching changes depending on a size of the power receiver or the power feeder and a traveling speed of the vehicle.

Calibration of Electrical Characteristic Acquisition Unit

It is possible to arrange a device for measuring a lateral deviation position and a ground level of the vehicle around the power transmitter for measurement, measure a power amount when the vehicle passes through the power transmitter for measurement, and in a case where there is a difference between the measured power amount and a power amount calculated from efficiency of a combination of a measured value of the device and the power amount, a conversion gain of the electrical characteristic acquisition unit on the vehicle side may be adjusted so as to reduce the difference. It is possible to arrange a device for measuring a lateral deviation position and a ground level in a vehicle, measure a power amount when the vehicle passes through the power transmitter for measurement, and in a case where there is a difference between the measured power amount and a power amount calculated from a combination of a measured value of the device, a conversion gain of the electrical characteristic acquisition unit on the power segment side may be adjusted so as to reduce the difference.

Although the embodiment to which the disclosure achieved by the present inventors is applied is described above, the present disclosure is not limited by the description and the drawings being a part of the disclosure of the present invention by this embodiment. That is, all other embodiments and examples and operation technologies carried out by one skilled in the art on the basis of this embodiment are included in the scope of the present disclosure.

INDUSTRIAL APPLICABILITY

According to the present disclosure, it is possible to provide a contactless power feeding system, a control program for the contactless power feeding system, a vehicle, and a contactless power feeding power receiving device capable of individually detecting abnormality of a power supply segment and detecting abnormality in power supply segment even in a case where abnormality occurs in a plurality of consecutive power supply segments.

REFERENCE SIGNS LIST

1 CONTACTLESS POWER FEEDING SYSTEM
2 VEHICLE
3 POWER SUPPLY SEGMENT
4 SERVER DEVICE
21 POWER RECEIVER
22 RECTIFIER
23 BATTERY
24 AUXILIARY MACHINE/AIR CONDITIONER
25 MOTOR
26 ELECTRICAL CHARACTERISTIC ACQUISITION UNIT
31 RECTIFIER
32*a* to 32*d* INVERTER
33*a* to 33*d* POWER TRANSMITTER
41 ACQUISITION TIMING ADJUSTMENT UNIT
42 ABNORMALITY DETERMINATION UNIT
NW ELECTRICAL COMMUNICATION LINE

The invention claimed is:

1. A contactless power feeding system that contactlessly supplies power from a power supply segment provided on a traveling path of a vehicle to a traveling vehicle, the contactless power feeding system comprising:

a power transmission characteristic acquisition unit that is provided on a side of the power supply segment and measures a power transmission characteristic of the power supply segment;

a power reception characteristic acquisition unit that is provided on a side of the vehicle and measures a power reception characteristic of the vehicle; and an abnormality detection means that matches a measurement period of the power transmission characteristic of the power supply segment measured by the power transmission characteristic acquisition unit with a measurement period of the power reception characteristic of the vehicle measured by the power reception characteristic acquisition unit, calculates efficiency of the power supply segment using the power transmission characteristic of the power supply segment and the power reception characteristic of the vehicle, the measurement periods of which are matched within 50 μs or less, and determines abnormality of the power supply segment on a basis of the calculated efficiency, wherein the power reception characteristic acquisition unit adjusts a conversion gain based on the determined abnormality.

2. A non-transitory computer-readable recording medium storing a control program of a contactless power feeding system that contactlessly supplies power from a power supply segment provided on a traveling path of a vehicle to a traveling vehicle, the control program of the contactless power feeding system causing a computer to execute:

a power transmission characteristic acquisition step of measuring a power transmission characteristic of the power supply segment;

a power reception characteristic acquisition step of measuring a power reception characteristic of the vehicle;

an abnormality detection step of matching a measurement period of the power transmission characteristic of the power supply segment measured by the power transmission characteristic acquisition step with a measurement period of the power reception characteristic of the vehicle measured by the power reception characteristic acquisition process, calculating efficiency of the power supply segment using the power transmission characteristic of the power supply segment and the power reception characteristic of the vehicle, the measurement periods of which are matched within 50 μs or less, and determining abnormality of the power supply segment on a basis of the calculated efficiency, a conversion gain adjustment step that adjusts a conversion gain of a power reception characteristic acquisition unit of the vehicle based on the determined abnormality.

3. A vehicle capable of receiving power from a contactless power feeding system that contactlessly supplies power from a power supply segment provided on a traveling path to the vehicle, the vehicle comprising:

a power reception characteristic acquisition unit that measures a power reception characteristic of the vehicle, the vehicle that causes an abnormality detection means to match a measurement period of a power transmission characteristic of the power supply segment measured by a power transmission characteristic acquisition unit provided on a side of the power supply segment with a measurement period of the power reception characteristic of the vehicle measured by the power reception characteristic acquisition unit, calculate efficiency of the power supply segment using the power transmission characteristic of the power supply segment and the power reception characteristic of the vehicle, the measurement periods of which are matched within 50 μs or less, and determine abnormality of the power supply segment on a basis of the calculated efficiency, wherein the vehicle causes the power reception characteristic acquisition unit to adjust a conversion gain based on the determined abnormality.

4. A contactless power feeding power receiving device mounted on a vehicle capable of receiving power from a contactless power feeding system that contactlessly supplies power from a power supply segment provided on a traveling path to the vehicle, the contactless power feeding power receiving device comprising:

a power reception characteristic acquisition unit that measures a power reception characteristic of the vehicle, the contactless power feeding power receiving device that causes an abnormality detection means to match a measurement period of a power transmission characteristic of the power supply segment measured by a power transmission characteristic acquisition unit provided on a side of the power supply segment with a measurement period of the power reception characteristic of the vehicle measured by the power reception characteristic acquisition unit, calculate efficiency of the power supply segment using the power transmission characteristic of the power supply segment and the power reception characteristic of the vehicle, the measurement periods of which are matched within 50 μs or less, and determine abnormality of the power supply segment on a basis of the calculated efficiency, wherein the contactless power feeding power receiving device causes the power reception characteristic acquisition unit to adjust a conversion gain based on the determined abnormality.

* * * * *